United States Patent
Tiirola et al.

(10) Patent No.: US 7,764,705 B2
(45) Date of Patent: Jul. 27, 2010

(54) INTERFERENCE CANCELLATION UNIT AND INTERFERENCE CANCELLATION METHOD

(75) Inventors: Esa Tiirola, Oulu (FI); Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 303 days.

(21) Appl. No.: 11/808,902

(22) Filed: Jun. 13, 2007

(65) Prior Publication Data

US 2008/0025200 A1  Jan. 31, 2008

(30) Foreign Application Priority Data

Jun. 22, 2006  (FI) .................. 20065438

(51) Int. Cl.
*H04L 12/28* (2006.01)
*H04B 1/10* (2006.01)

(52) U.S. Cl. ............ 370/431; 455/278.1; 375/346
(58) Field of Classification Search ............ 370/431, 370/335, 491; 455/278.1
See application file for complete search history.

(56) References Cited

U.S. PATENT DOCUMENTS

| | | | | |
|---|---|---|---|---|
| 5,680,418 | A * | 10/1997 | Croft et al. | 375/346 |
| 5,680,419 | A | 10/1997 | Bottomley | |
| 6,173,014 | B1 | 1/2001 | Forssen et al. | |
| 6,359,923 | B1 * | 3/2002 | Agee et al. | 375/130 |
| 6,934,346 | B2 * | 8/2005 | Lindoff et al. | 375/349 |
| 7,512,412 | B2 * | 3/2009 | Mese et al. | 455/522 |
| 7,546,105 | B2 * | 6/2009 | Piirainen | 455/278.1 |
| 2005/0002440 | A1 * | 1/2005 | Alamouti et al. | 375/141 |
| 2006/0078063 | A1 * | 4/2006 | Hottinen | 375/267 |
| 2006/0209721 | A1 * | 9/2006 | Mese et al. | 370/254 |
| 2007/0036179 | A1 * | 2/2007 | Palanki et al. | 370/491 |
| 2007/0041457 | A1 * | 2/2007 | Kadous et al. | 375/260 |
| 2007/0211667 | A1 * | 9/2007 | Agrawal et al. | 370/335 |
| 2007/0270100 | A1 * | 11/2007 | Agrawal et al. | 455/67.11 |
| 2009/0185602 | A1 * | 7/2009 | Atarashi et al. | 375/141 |

FOREIGN PATENT DOCUMENTS

EP  1 385 293 A2  1/2004

OTHER PUBLICATIONS

Frank, Tobias et al., "*IGDMA—A Promising Multiple Access Scheme for Future Radio Systems*", vol. 2, Sep. 11-14, 2005, pp. 1214-1218.
Sorger, Uli et al., "*Interleaved FDMA—A New Spread-Spectrum Multiple—Access Scheme*", ICC'98, vol. 2, Jun. 7-11, 1998, pp. 1013-1017.
International search PCT/FI2007/050369 filed Jun. 18, 2007.

* cited by examiner

*Primary Examiner*—Chi H Pham
*Assistant Examiner*—Robert Lopata
(74) *Attorney, Agent, or Firm*—Squire, Sanders & Dempsey L.L.P.

(57) ABSTRACT

An interference cancellation unit having as an input two or more IFDMA signals comprising a multitude of frequency bins is provided. The unit comprises a channel estimator for determining a channel estimate from the input signals, a matrix calculator for determining an error covariance matrix of the input signals, and an estimator for determining weight factors on the basis of the channel estimate and the error covariance matrix and weighting and combining the input signals. The unit further comprises a preprocessor for removing unwanted frequency bins from the input signals prior to the error covariance calculation.

12 Claims, 5 Drawing Sheets

INTERFERENCE CANCELLATION UNIT AND INTERFERENCE CANCELLATION METHOD

FIELD

The invention relates to interference cancellation when receiving interleaved frequency division multiple access signals.

BACKGROUND

In wireless telecommunication systems, the design of data transmission is a challenging task. The data transmission may be impaired by several factors, such as fast and slow fading, multipath propagation, interference from other systems and interference from other users within the same system.

Several receiver algorithms have been designed to meet the challenges of wireless telecommunication systems. A receiver of a wireless system must be able to capture and demodulate the transmitted signal as efficiently as possible. Maximum Ratio Combining (MRC), Maximum Likelihood receiver and Maximum A Posteriori Receiver (MAP) are examples of known receiver algorithms.

For environments where interference is present, interference suppression methods have been developed. An example of such a method is Interference Rejection Combiner, which is an efficient method in applications where multiple transmission paths are utilized in the transmission of signals. An example of such utilization is the use of multiple antennas.

In general, to transmit signals of a multitude of users simultaneously, several channels are needed. In systems offering a large bandwidth to users, several channels may be offered to a single user. The channels may be realized with frequencies (frequency division multiple access), time slots (time division multiple access), codes (code division multiple access) and different combinations of the above. One example of an access method studied lately is single carrier frequency division multiple access, SC-FDMA. One promising variant of SC-FDMA is interleaved frequency division multiple access, IFDMA.

In the distributed type transmission, such as IFDMA, the signals of different users are orthogonal with respect to each other in frequency domain but interfere with each other in time domain. The present IRC algorithms, such as space-only IRC, space-time IRC, do not work efficiently in systems where the signals of different users are distributed among subcarriers.

BRIEF DESCRIPTION OF THE INVENTION

An object of the invention is to provide an improved solution for interference cancellation. According to an aspect of the invention, there is provided an interference cancellation unit having as an input two or more IFDMA signals comprising a multitude of frequency bins, the unit comprising: a channel estimator for determining a channel estimate from the input signals, a matrix calculator for determining an error covariance matrix of the input signals, an estimator for determining weight factors on the basis of the channel estimate and the error covariance matrix and weighting and combining the input signals, a preprocessor for removing unwanted frequency bins from the input signals prior to the error covariance calculation.

According to another aspect of the invention, there is provided an interference cancellation method having as an input two or more IFDMA signals, comprising a multitude of frequency bins, the method comprising determining a channel estimate from the input signals, determining an error covariance matrix of the input signals, determining weight factors on the basis of the channel estimate and the error covariance matrix and weighting and combining the input signals, removing unwanted frequency bins from the input signals prior the error covariance calculation.

According to another aspect of the invention, there is provided an IFDMA receiver, comprising a radio frequency unit for receiving two or more IFDMA signals, comprising a multitude of frequency bins, a channel estimator for determining a channel estimate from the input signals, a matrix calculator for determining an error covariance matrix of the input signals, an estimator for determining weight factors on the basis of the channel estimate and the error covariance matrix and weighting and combining the input signals, a preprocessor for removing unwanted frequency bins from the input signals prior to the error covariance calculation.

According to yet another aspect of the invention, there is provided an interference cancellation unit having as an input two or more IFDMA signals, comprising a multitude of frequency bins, the unit comprising means for determining a channel estimate from the input signals, means for determining an error covariance matrix of the input signals, means for determining weight factors on the basis of the channel estimate and the error covariance matrix and weighting and combining the input signals, means for removing unwanted frequency bins from the input signals prior to the error covariance determination.

Embodiments of the invention provide several advantages. The proposed solution enhances the interference cancellation as the effect of undesired frequency bins may be removed from the error covariance matrix. Signals using different orthogonal frequency recourses can be removed from the received time domain signal without any extra losses due to parameter estimation.

In an embodiment of the invention, pilot signals of users that are orthogonal in the frequency domain are removed from the signal containing the desired user's pilot signal. The frequency bin selection and removal is based on the frequency spectrum utilized by the pilot and data channel of the desired user. The receiver has the knowledge of frequency bins used by different users in the IFDMA system.

Embodiments also support cases where different other cell users use orthogonal pilot signals

LIST OF DRAWINGS

In the following, the invention will be described in greater detail with reference to the embodiments and the accompanying drawings, in which FIG. 1 illustrates an example of a communication system;

DESCRIPTION OF EMBODIMENTS

Figure 1:
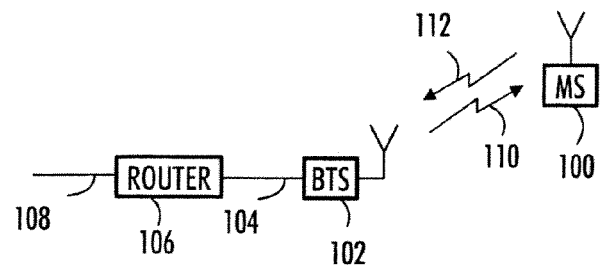

FIG. 1 illustrates an example of a communication system in which embodiments of the invention can be applied. FIG. 1 shows a mobile station (MS) 100 and a part of the radio access network of the telecommunications network, namely a base station (BTS) 102. The base station 102 is connected 104 to a router 106, which in turn is connected 108 to other parts of the telecommunication network, such as a core network or other parts of the radio access network.

The mobile station 100 may have a bidirectional connection 110, 112 to the base station 102. The bi-directional connection comprises a downlink 110 and an uplink 112 connection. The multiple access and modulation methods used on uplink and downlink may be different or similar, depending on system parameters. In a proposed evolution of the $3^{rd}$ generation of UMTS (Universal Mobile Telephone System), IFDMA has been proposed to be used on the uplink connections. However, embodiments of the invention are not limited to any particular telecommunication system or UMTS or uplink connections.

Figure 2:
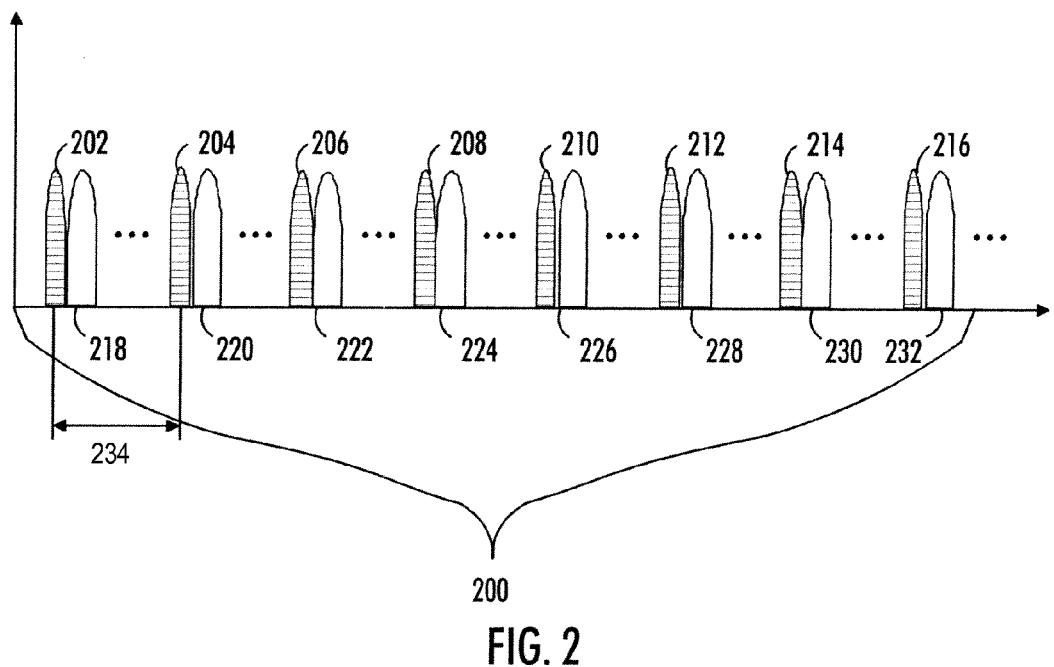
FIG. 2 illustrates IFDMA.

FIG. 2 illustrates IFDMA. In IFDMA, the total frequency bandwidth 200 of a channel is divided between the users. The transmission of each user is distributed over the frequency bandwidth 200. In the example of FIG. 2 there are two users. The transmission of a user 1 utilizes eight subfrequencies or frequency bins 202 to 216 which are equidistant. The frequency difference 234 of the pins is constant. Respectively, the transmission of a user 2 utilizes eight frequency bins 218 to 232 which are equidistant. Within a cell, the transmissions of different users are orthogonal with each other. However, transmissions in surrounding cells may cause interference. The amount of interference depends mainly on the frequency reuse parameters of the system.

Figure 3:
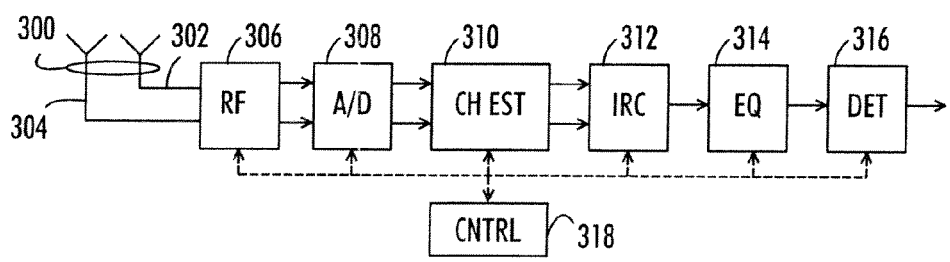
FIG. 3 illustrates a simplified example of a receiver.

FIG. 3 illustrates a simplified example of a receiver where IRC is applied. The receiver comprises antennas 300 which receive a signal 302, 304. The received signals are amplified and filtered in radio frequency parts 306 of the receiver. The signals are converted into a digital form in an A/D converter 308. The receiver comprises a channel estimator 310 which is configured to calculate channel estimates for the received signals. The channel estimates may be calculated using a pilot signal, pilot symbols or a training sequence included in the received signal. The channel estimator 310 may be realized using a processor and associated software or discrete digital components. The receiver comprises an interference cancellation unit 312, an equalizer 314 and finally a decoder 316. In the interference cancellation unit, the error covariance matrix is calculated. The error covariance matrix shows the correlation between input signals. Weight factors are determined on the basis of channel estimates and the error covariance matrix. The input signals are weighted and combined. Equalizer algorithms are typically derived for a diagonal correlation matrix and the purpose of IRC is to diagonalize the matrix. The receiver further comprises a controller 318 which controls the operation of the receiver. For example, the controller is aware of the IFDMA frequency bin usage. Thus, it is aware which frequency bins in a received signal are reserved for the desired user.

One problem with IFDMA is that signals of different users utilizing orthogonal comb-shaped frequency spectrum interfere with each other in time domain. Time domain signal is the one which is used to calculate the error covariance matrix $R_{uu}$ when interference rejection combining is utilized. In an embodiment, a pilot signal is utilized when determining an error covariance matrix and channel estimate. The signal received in a receiver is of the form $$r = hs + u \quad (1)$$

where s is the received information symbol vector, h is the channel coefficient vector and u interference and noise vector.

Spatial properties of undesired signal components are illustrated by error covariance matrix. The error covariance matrix may be calculated as follows $$R_{uu} = E[uu^H], \quad (2)$$

where E denotes statistical expectation. The superscript $^H$ denotes a complex conjugation and transposition of a vector.

Figure 4:
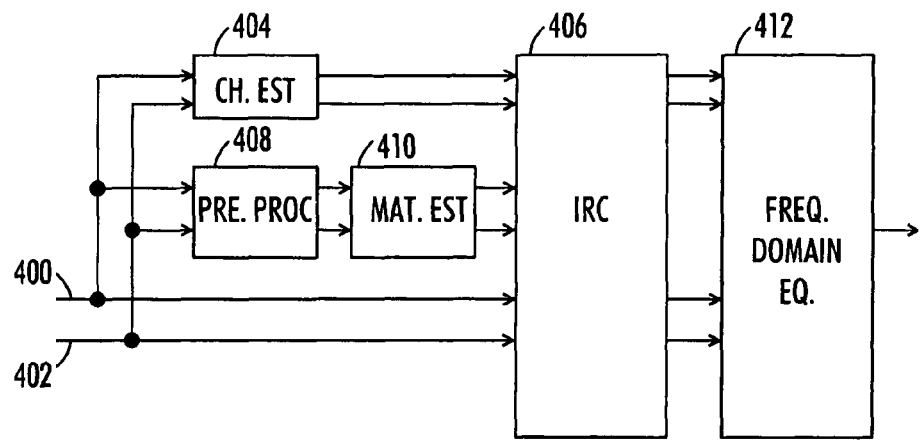
FIG. 4 illustrates an example of the implementation of interference rejection cancellation.

FIG. 4 illustrates an example of the implementation of interference rejection cancellation of a receiver where embodiments of the invention may be applied.

The input comprises IFDMA signals 400, 402 comprising a multitude of frequency bins. Part of the frequency bins are used in the transmission of the signal of a desired user and part of the frequency bins are used for the transmission of other users. Referring to the receiver of FIG. 3, the signals 400, 402 come from the A/D converter. In this example, the number of signals is two, but in practice the number of signals may be greater. The signals are taken to a channel estimator 404 configured to calculate channel estimates for the received signals. In this example, the channel estimates are calculated using pilot signals included in the received signal. The channel estimator may be realized using a processor and associated software or discrete digital components. The channel estimates are taken to an interference cancellation unit 406.

The IFDMA signals 400, 402 are taken to a preprocessor 408. The preprocessor is configured to remove unwanted frequency bins from the input signals. The output of the preprocessor thus comprises the modified input signals with only those frequency bins left which are used in the transmission of the signal of the desired user. The modified input signals are taken to a calculation unit 410 which calculates the error covariance matrix. The error covariance matrix may be calculated using the formula 2, for example. The calculation unit 410 may be realized using a processor and associated software or discrete digital components.

The error covariance matrix is taken to the interference cancellation unit 406 which is configured to determine weight factors on the basis of the channel estimate and the error covariance matrix. The cancellation unit weights the input signals with the determined weight factors and combines the input signals. The interference cancellation unit 406 may utilize known interference cancellation algorithms when determining the weights and combining the signals. Examples of known algorithms include space-only IRC and space-time IRC. The interference cancellation unit 406 may be realized using a processor and associated software or discrete digital components.

The output signal of the interference cancellation signal is taken to an equalizer 412 which equalizes the signal using known methods, such as frequency domain equalization. The equalizer 412 may be realized using a processor and associated software or discrete digital components.

Figure 5:
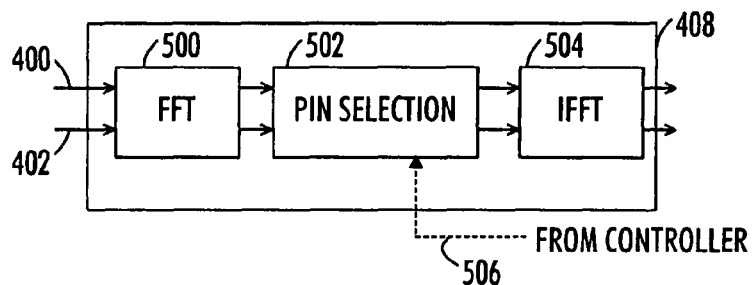
FIG. 5 illustrates an example of the implementation of the preprocessor.
Figure 6A:
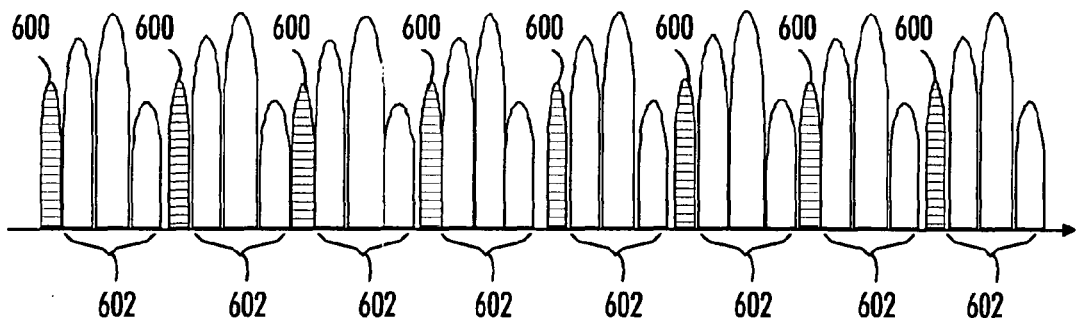
FIGS. 6A and 6B illustrate the signal before and after the preprocessor.

FIG. 5 illustrates an example of the implementation of the preprocessor 408 of a receiver where embodiments of invention may be applied. The preprocessor has as input signals 400, 402 received signals which typically but not necessarily comprise a pilot signal. The frequency domain representation of the considered signals is of the form shown in FIG. 6A. The signals comprise frequency bins. In this example, the available frequency bins are divided by four users, the desired user 600 and three other users 602.

Figure 6B:
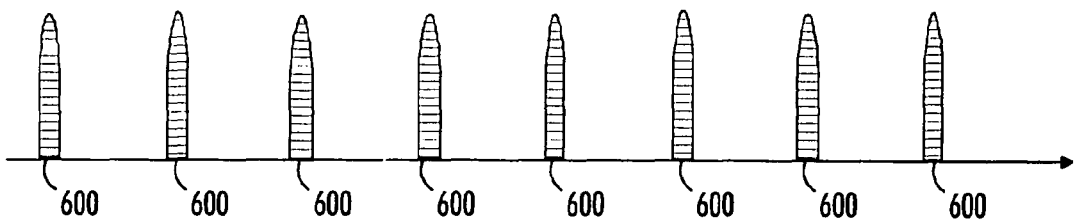

The input signals are taken to an FFT converter 500 which calculates a fast fourier transform of the signals, i.e. transforms the time domain signal to frequency domain. The transformed signal is taken to a bin selection unit 504. The bin selection unit receives input 506 from the controller of the receiver. The controller is aware of the IFDMA frequency bin usage. The controller sends this information to the bin selection unit 502. The bin selection unit selects the frequency bins 600 which are reserved for the desired signal for continuation and sets the value of other frequency bins 602 to zero. Thus, in the output of the bin selection unit, the signals are of the form shown in FIG. 6B. Only the frequency bins 600 reserved for the desired user are left. The bin selection unit 504 may be realized using a processor and associated software or discrete digital components. The bin selection unit may be realized as a filter, such as an adjustable comb filter.

Figure 7:
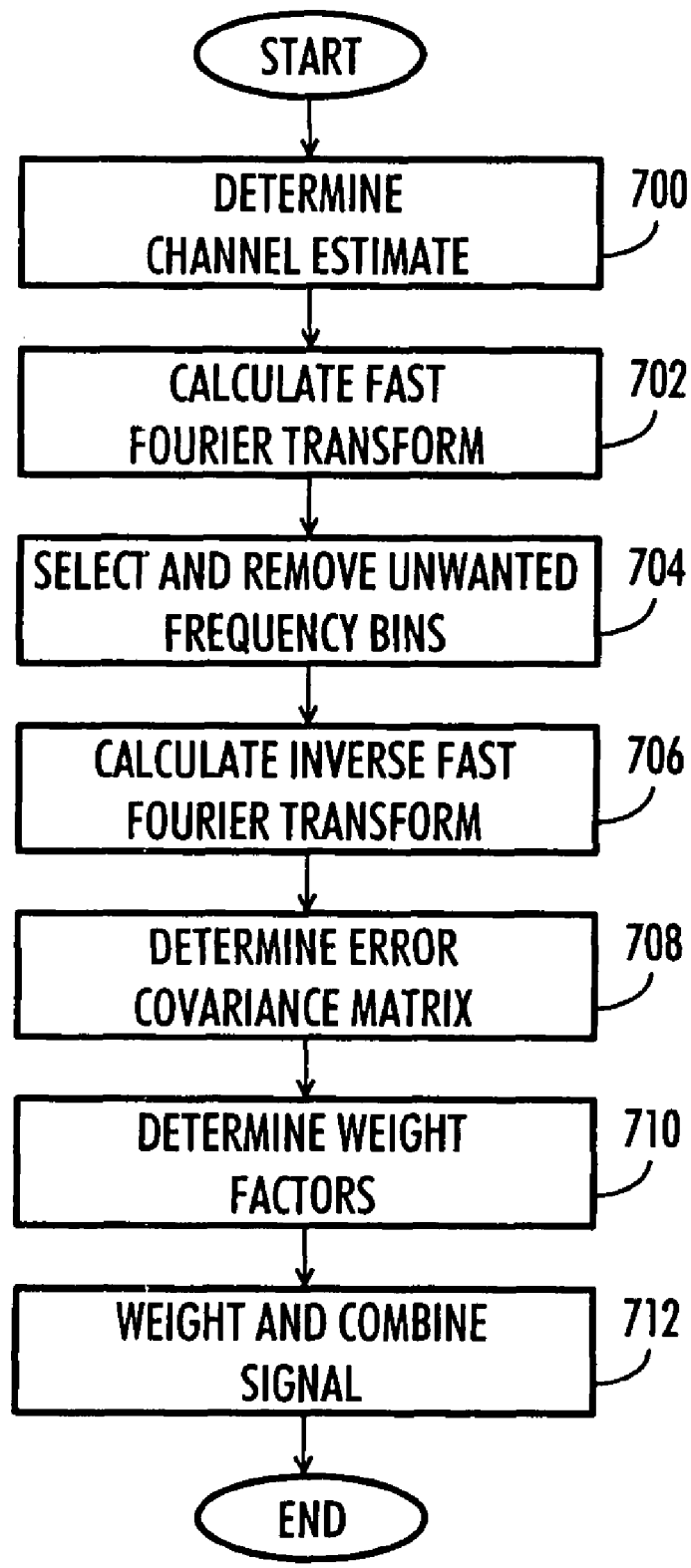
FIG. 7 is a flowchart illustrating an embodiment of the invention.

The flowchart of FIG. 7 illustrates an embodiment of the invention. In step 700, a channel estimate is determined from the input signals. The channel estimate may be determined using a pilot signal, pilot symbols or a training sequence, for example.

In step 702, a fast fourier transform is determined for the input signal and a transformed signal is obtained.

In step 704, unwanted frequency bins are filtered from the transformed signal and a filtered signal is obtained.

In step 706, an inverse fast fourier transform is calculated for the filtered signal and a retransformed signal is obtained.

In step 708, an error covariance matrix is determined from the retransformed signal.

In step 710, weight factors are determined on the basis of the channel estimate and the error covariance matrix.

In step 712, the input signals are weighted with the weight factors and combined.

Figure 8A:
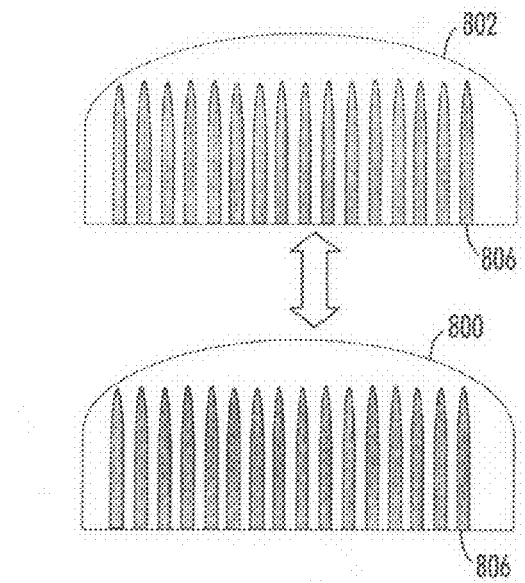
FIGS. 8A to 8C illustrate three different simulation scenarios.
Figure 8B:
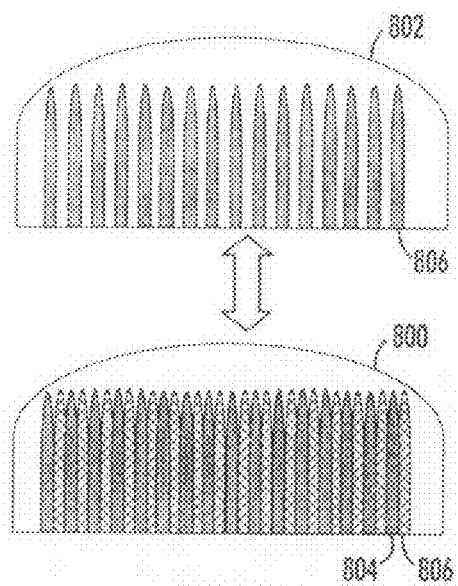
Figure 8C:
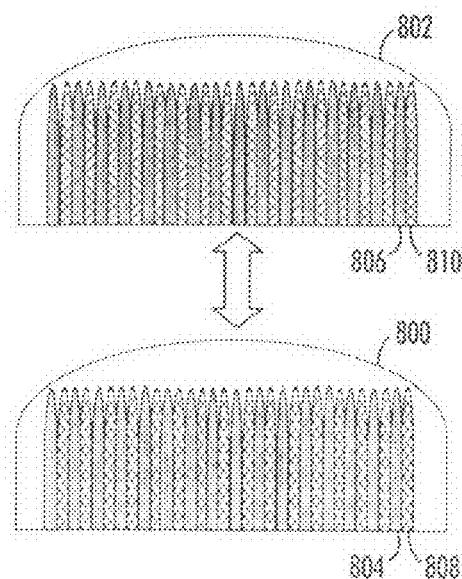

The performance of the proposed solution has been verified with simulations. FIGS. 8A to 8C illustrate three different simulation scenarios. The scenario of FIG. 8A is a two-user situation. The desired user is in cell 800 using frequency bins 804. In FIG. 8A, the bins are grayed. Another user is in a neighboring cell 802 using the same frequency bins 806.

The scenario of FIG. 8B is a three-user situation. The desired user is in cell 800 using frequency bins 804. In FIG. 8A, the bins are grayed. A second user is in the same cell using frequency bins 808. In FIG. 8B, the frequency bins of the second user are hatched. A third user is in a neighboring cell 802 using the same frequency bins 806 as the desired user.

The scenario of FIG. 8C is a four-user situation. The desired user is in cell 800 using frequency bins 804. The bins are grayed. A second user is in the same cell using frequency bins 808. In FIG. 8C, the frequency bins of the second user are hatched. A third user is in a neighboring cell 802 using the same frequency bins 806 as the desired user. The bins are grayed. A fourth user is in the neighboring cell 802 using the same frequency bins 810 as the second user. In FIG. 8C, the frequency bins of the fourth user are hatched.

Table 1 shows the assumptions and parameters for the simulation. A symbol repetition factor (SRF) of 2 was used in the simulations. This means that the total frequency spectrum, 5 MHz, is divided into 2 orthogonal comb-shaped frequency recourses. The simulation setup is such that the transmission power of the desired user is kept constant while varying the transmission power of the interfering users according to the C/I value. C/I is defined as signal power of the own signal divided by the signal power of each of the interfering signals.

TABLE 1

| | |
|---|---|
| System | Single carrier FDMA |
| Simulated bandwidth | 5 MHz |
| Symbol repetition factor | 2 |
| Modulation and coding scheme | QPSK ⅓ |
| Data rate | 1.05 Mb/s |
| Simulated channel | Exp. decay channel (18 taps) rms. Delay spread = 470 ns |
| Sampling rate | 7.68 Ms/s |
| HARQ | |

Figure 9:
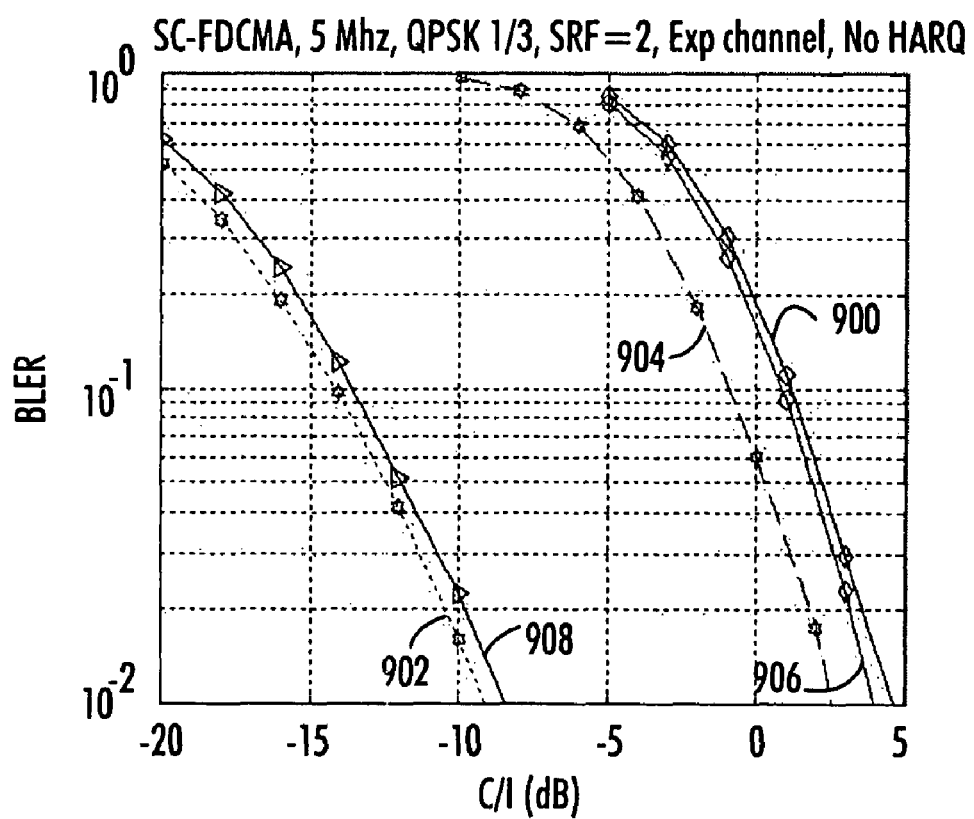
FIG. 9 shows results of simulations.

FIG. 9 shows the results of the simulations. Carrier to interference is on the x-axis and block error rate is on the y-axis. The first reference case 900 is MMSE (Minimum Mean Square Error) with the four users of the scenario of FIG. 8C. In this case, IRC is not utilized at all. The other reference cases are the scenario 902 of FIG. 8A with two users, the scenario 904 of FIG. 8B with three users and the scenario 906 of FIG. 8C with four users. In these scenarios of FIGS. 8A to 8C, a prior art IRC method is utilized without the inventive preprocessing.

It can be noted that the prior art IRC provides a very good gain (about 15 dB) over MMSE when the number of users is two (scenario 902). However, with three users in the system, the gain of the prior art IRC is only 2 dB.—Furthermore, with four users (scenario 906) the gain is only 0.5 dB when compared to MMSE.

The inventive preprocessor is utilized in connection with a known IRC method in the scenario 908 with the four users of FIG. 8C. In this scenario, it is possible to obtain a gain of about 15 dB against MMSE also with four users in the system. Thus, the proposed solution provides a remarkably better gain than the prior art IRC solution. The reason for this is that using the invented scheme, the error covariance matrix reflects the actual interference scenario of the IFDMA system.

Embodiments of the invention may be realized in a base station of a cellular base station, for example. The base station may comprise a processor or several processors configured to perform at least some of the steps described in connection with the flowchart of FIG. 7 and in connection with FIGS. 3 to 9.

The embodiments may be implemented as a computer program comprising instructions for executing a computer process for an interference cancellation method having as an input two or more IFDMA signals, comprising a multitude of frequency bins.

The process comprises determining a channel estimate from the input signals, determining an error covariance matrix of the input signals, determining weight factors on the basis of the channel estimate and the error covariance matrix and weighting and combining the input signals and removing unwanted frequency bins from the input signals prior the error covariance calculation.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. An apparatus, comprising:
a processor; and
a memory including computer program code,
the memory and the computer program code configured to, with the processor, cause the apparatus at least to
determine a channel estimate from interleaved frequency division multiple access input signals,
determine an error covariance matrix of the input signals,
determine weight factors on the basis of the channel estimate and the error covariance matrix and weighting and combining the input signals, and
remove unwanted frequency bins from the input signals prior to the error covariance calculation.

2. The apparatus of claim 1, wherein the apparatus comprises an adjustable comb filter.

3. The apparatus of claim 1, wherein the memory and the computer program code are further configured to, with the processor, cause the apparatus at least to:
determine a fast fourier transform for the input signals;
filter the unwanted frequency bins from the fast fourier transform; and
calculate an inverse fast fourier transform for the filtered fast fourier transform.

4. The apparatus of claim 1, wherein the input signals comprise a desired signal on a first set of frequency bins and one or more unwanted signals each on a second set of frequency bins, wherein the first and second sets of frequency bins are orthogonal with each other.

5. A method, comprising:
providing, by a processor, a multitude of frequency bins;
determining, by the processor, a channel estimate from an interleaved frequency division multiple access input signals;
determining, by the processor, an error covariance matrix of the input signals;
determining, by the processor, weight factors on the basis of the channel estimate and the error covariance matrix and weighting and combining the input signals; and
removing, by the processor, unwanted frequency bins from the input signals prior the error covariance calculation.

6. The method of claim 5, further comprising:
determining a fast fourier transform for the input signals in a first calculation unit;
filtering the unwanted frequency bins from the output signal of the first calculation unit;
calculating an inverse fast fourier transform for the filtered signal;
filtering the unwanted frequency bins from the output signal of the first calculation unit; and
calculating an inverse fast fourier transform for the output signal of a frequency bin selection unit with a second unit.

7. An apparatus, comprising
a processor; and
a memory including computer program code,
the memory and the computer program code configured to, with the processor, cause the apparatus at least to
receive two or more interleaved frequency division multiple access input signals, and having a multitude of frequency bins,
determine a channel estimate from the input signals,
determine an error covariance matrix of the input signals,
determine weight factors on the basis of the channel estimate and the error covariance matrix and weighting and combining the input signals, and
remove unwanted frequency bins from the input signals prior to the error covariance calculation.

8. An apparatus, comprising:
first determining means for determining a channel estimate from interleaved frequency division multiple access input signals;
second determining means for determining an error covariance matrix of the input signals;
third determining means for determining weight factors on the basis of the channel estimate and the error covariance matrix and weighting and combining the input signals; and
removing means for removing unwanted frequency bins from the input signals prior to the error covariance determination.

9. A non-transitory computer-readable storage medium encoded with instructions configured to control a processor to perform a process, the process comprising:
determining a channel estimate from interleaved frequency division multiple access input signals;
determining an error covariance matrix of the input signals;
determining weight factors on the basis of the channel estimate and the error covariance matrix and weighting and combining the input signals: and,
removing unwanted frequency bins from the input signals prior to the error covariance calculation.

10. The computer-readable storage medium of claim 9, wherein the computer readable medium comprises at least one of a program storage medium, a record medium, a computer readable memory, a computer readable software distribution package, a computer readable signal, a computer readable telecommunications signal, and a computer readable compressed software package.

11. An apparatus, comprising:
channel estimating means for determining a channel estimate from interleaved frequency division multiple access input signals;
matrix calculator means for determining an error covariance matrix of the input signals;
estimator means for determining weight factors on the basis of the channel estimate and the error covariance matrix and weighting and combining the input signals; and
preprocessing means for removing unwanted frequency bins from the input signals prior to the error covariance calculation.

12. An apparatus, comprising:
a radio frequency receiving means for receiving two or more interleaved frequency division multiple access input signals, comprising a multitude of frequency bins;
a channel estimator means for determining a channel estimate from the input signals;
a matrix calculator means for determining an error covariance matrix of the input signals;
an estimator means for determining weight factors on the basis of the channel estimate and the error covariance matrix and weighting and combining the input signals; and
a preprocessor means for removing unwanted frequency bins from the input signals prior to the error covariance calculation.

* * * * *